US 6,808,624 B1

(12) United States Patent
Norris

(10) Patent No.: US 6,808,624 B1
(45) Date of Patent: Oct. 26, 2004

(54) REPLACEABLE MEDIA FILTRATION

(76) Inventor: Joe Norris, 270 Castle Blvd., Akron, OH (US) 44313

( * ) Notice: Subject to any disclaimer, the term of this patent is extended or adjusted under 35 U.S.C. 154(b) by 216 days.

(21) Appl. No.: 10/237,283

(22) Filed: Sep. 6, 2002

Related U.S. Application Data
(60) Provisional application No. 60/324,575, filed on Sep. 24, 2001.

(51) Int. Cl.[7] .......................... B01D 33/06; A01K 63/04
(52) U.S. Cl. ...................... 210/169; 210/232; 210/267; 210/282; 210/402; 210/416.2; 210/694; 210/780; 210/784; 210/786; 119/259; 119/261
(58) Field of Search ................................. 210/169, 232, 210/264, 267, 282, 402, 403, 404, 416.2, 694, 780, 784, 786; 119/259, 260, 261

(56) References Cited

U.S. PATENT DOCUMENTS 2,956,683 A * 10/1960 Clarke et al. ................ 210/330
5,837,138 A * 11/1998 Boele .......................... 210/237

* cited by examiner

Primary Examiner—Robert James Popovics

(57) ABSTRACT

An improved method for using replaceable filtration media in a rotatable drum. A plurality of media cartridges are installed on the rotatable drum. As the drum rotates, the media cartridges are alternately submerged and lifted from the water. The constant cycle of flooding, draining, and tumbling of the media provides excellent water filtration.

15 Claims, 4 Drawing Sheets

REPLACEABLE MEDIA FILTRATION

This application claims the benefit of Provisional Application 60/324,595, filed Sep. 24, 2001.

BACKGROUND

This invention relates to water purification, specifically an improved method of using replaceable filtration media in an air-driven system.

Air-driven systems promote plankton, which is beneficial to filter feeding animals. Air-driven systems also have relatively low water pressure making in line filtration a poor option.

Passive carbon filtration has been the only realistic option in air-driven systems. Passive carbon filtration consists of placing a bag of carbon somewhere in the aquarium system for water to flow around.

The passive use of carbon to remove "Gelbstoff" is not effective. "Gelbstoff" consist of organic compounds that give the water a yellow cast. It stands to reason that passive use of carbon is also not effective for removing other organics or metals.

Other problems associated with the passive use of carbon include:

(a) Detritus can block the outer surface of the carbon bag;
(b) Water flow in the interior of the carbon bag becomes stagnated;
(c) Carbon bags can move and interfere with water flow.

OBJECTS AND ADVANTAGES

Accordingly, several objects and advantages of the present invention are:

(a) To allow water to flow through activated carbon or other media in an air driven system;
(b) To provide a tumbling action for the media inside the cartridges. The constant shifting of the media ensures there will be no stagnation or detritus buildup.
(c) To have a number of media cartridges. Replacing small amounts of media weekly provides better water parameter stability than replacing large amounts monthly (See page 29, *Protein Skimming & Activated Carbon Secrets*, by Bob Goemans PH.D., 1999 Marc Weiss Companies, Inc., 945-894-9222).
d) Smaller amounts of carbon are likely to provide better overall performance (See page 29, *Protein Skimming & Activated Carbon Secrets*, by Bob Goemans PH.D., 1999 Marc Weiss Companies, Inc., 945-894-9222 and *Seascope*, Volume 15, Fall 1998 by Aquarium Systems, 1-800-822-1100).
e) The media cartridges are very accessible and easy to refill with fresh media.
f) The media cartridges are labeled to facilitate scheduled maintenance.
g) The media cartridges are fixed in place and will not interfere with water flow.

Further objects and advantages will become apparent from consideration of the drawings and ensuing description.

SUMMARY

The present invention relates to improved carbon or other media filtration. Media cartridges are fastened to a rotating drum that is about one half submerged. As the drum rotates, the media is continually flooded, drained, and tumbled providing superior filtration.

DESCRIPTION

A preferred embodiment of a replaceable media filtration system of the present invention is illustrated in FIG. 1, FIG. 2, and FIG. 3. The replaceable media filtration system has four media cartridges (1). The media cartridges (1) are labeled A,B,C, and D to facilitate scheduled media replacement.

The media cartridges (1) have a lid (2) that screws on. A piece of flat plastic (3) is glued to the lid (2). The flat plastic (3) has a hole (4) for a thumbscrew (5). The media cartridges (1) have plastic ribs (8) for rigidity. A fine mesh (9) is installed between the plastic ribs (8) as shown in FIG. 2. The fine mesh (9) holds the media in place. The media cartridges (1) are filled about 75% to capacity. The 25% void allows the media to shift and tumble as shown in FIG. 3.

A rotatable drum (6) has four cutouts (7) that the media cartridges (1) extend into. The rotatable drum (6) also has four threaded holes (4a) for the thumbscrews (5). The media cartridges (1) are fastened to the rotatable drum (6) with the plastic thumbscrews (5) as shown in FIG. 1.

The rotatable drum (6) is rotatably supported in a first tank (10), and is about one half submerged by a water level (11). As the drum (6) rotates, the media cartridges (1) are alternately submerged and lifted from waste laden water (15). This constant cycle of flooding, draining and tumbling the media within the cartridges (1) provides excellent filtration as shown in FIG. 3.

A purified water (12) is then circulated to a second tank (13) by way of an influent pipe (14). A pump (P) returns the waste laden water (15) to the media cartridges (1) by way of an effluent pipe (16) as shown in FIG. 4. The waste laden water (15) acts upon a set of capture fins (17) that are attached to the rotatable drum (6) to achieve rotation.

Other embodiments contemplated but not limited to are:
a) Any number of media cartridges (1) could be used;
b) Media cartridges (1) could be a multitude of shapes;
c) Media cartridges (1) that snap into the rotatable drum (6);
e) Media cartridges (1) with a hinged snap lid;
f) Media cartridges (1) could be made from a variety of materials;
g) Media cartridges (1) could be disposable;
h) A motor (M) could provide energy to rotate drum (6).

REFERENCE NUMERALS IN DRAWINGS

Media cartridge 1
Lid 2
Flat plastic 3
Hole 4
Threaded hole 4a
Thumscrew 5
Rotatable drum 6
Cutout 7
Rib 8
Mesh 9
First tank 10
Water level 11
Purified water 12
Second tank 13
Influent pipe 14
Waste laden water 15
Effluent pipe 16
Capture fins 17
Pump P
Motor M

CONCLUSION

Figure 1:
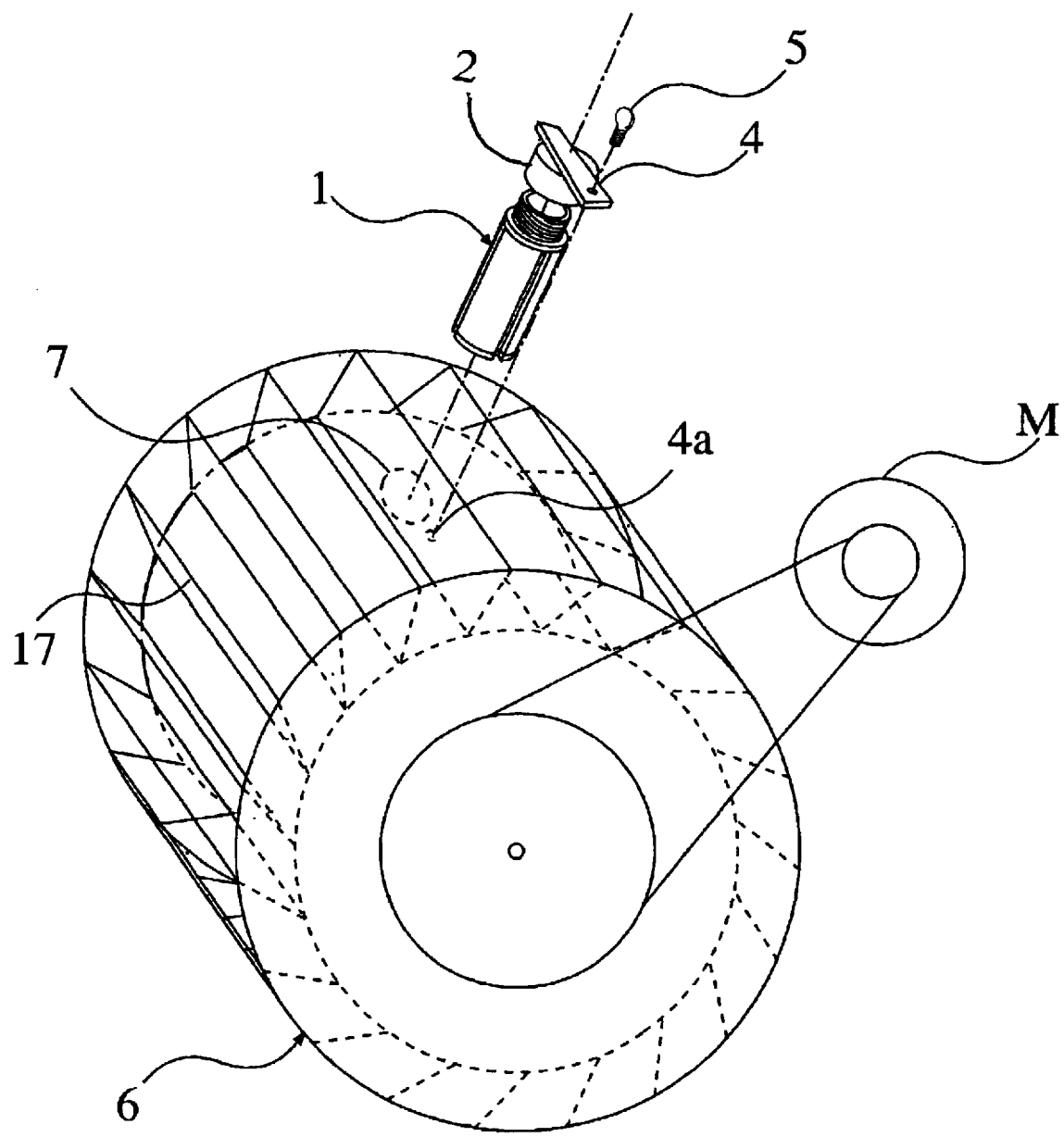
FIG. 1 is a perspective view showing how the media cartridges fit into the drum.
Figure 2:
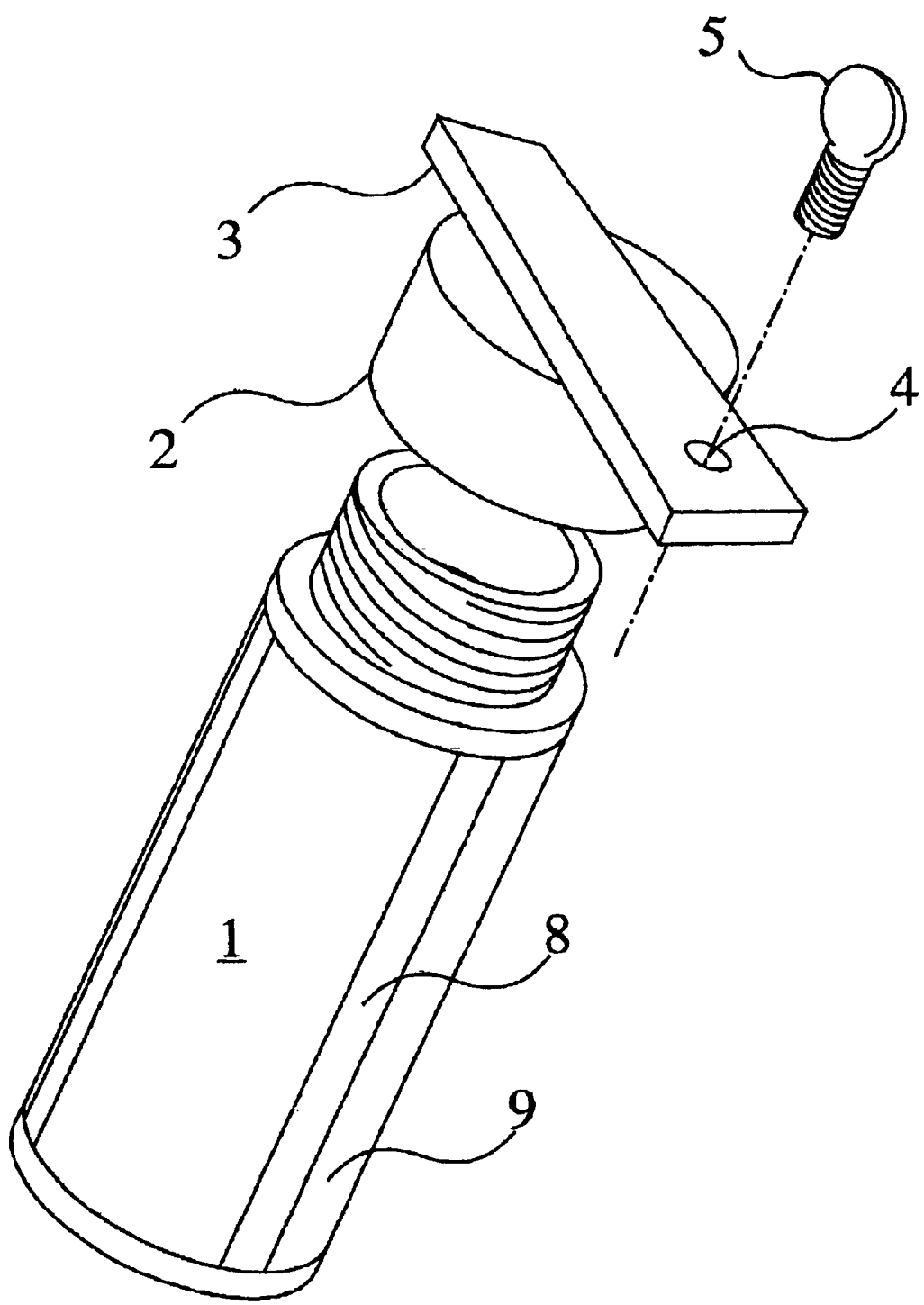
FIG. 2 details the media cartridge in perspective.
Figure 3:
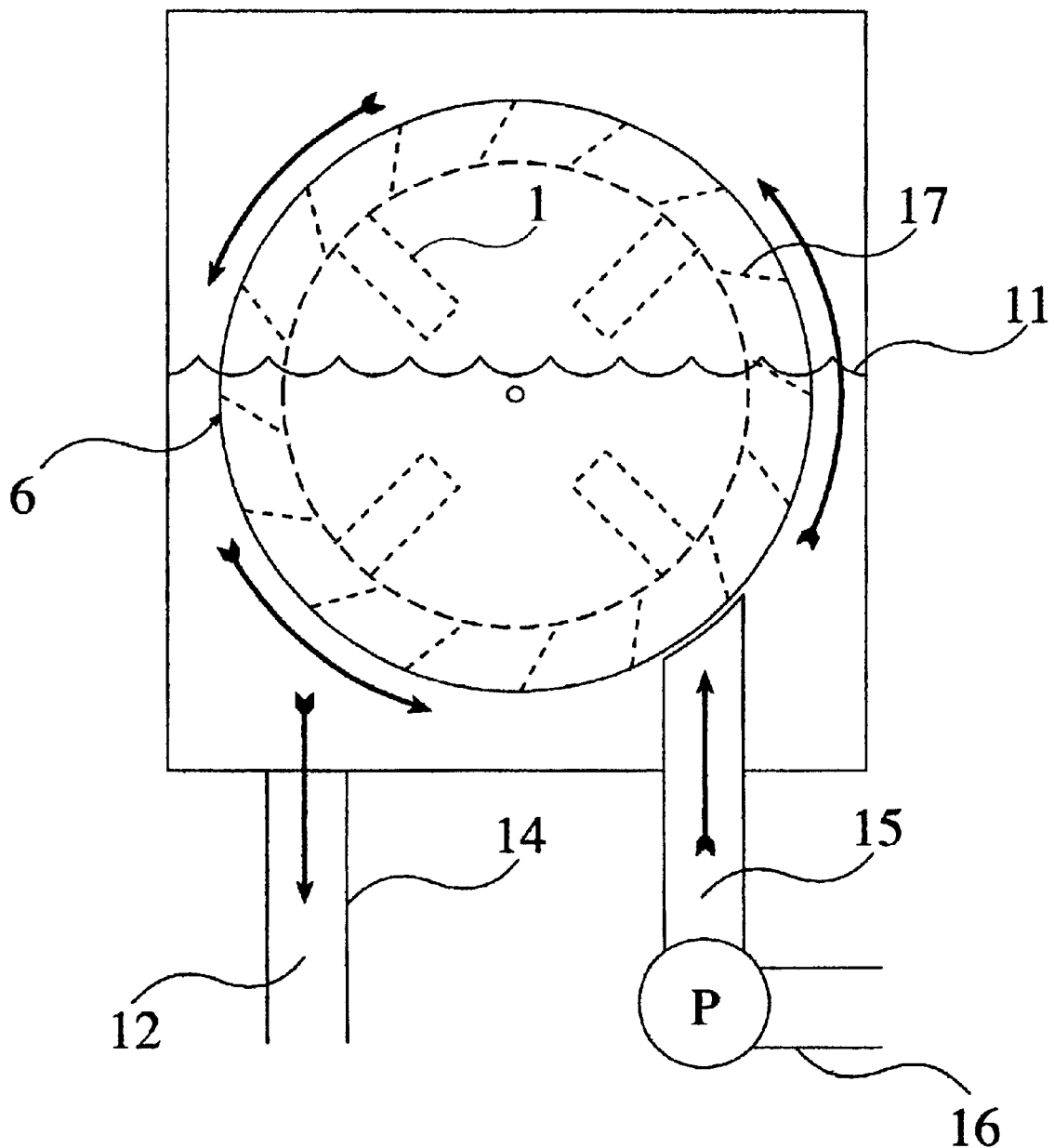
FIG. 3 is a front view that shows the flooding and draining of the media cartridges.
Figure 4:
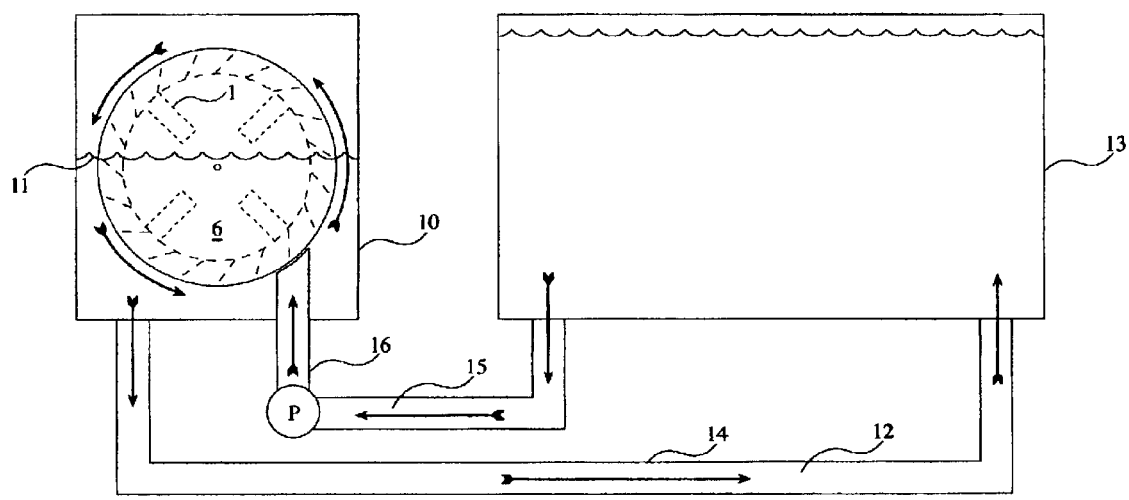
FIG. 4 is a front view showing water circulation.

The reader will see that the fitration system of the invention provides superior replacable media filtration. This enhances the ability of carbon or other media to remove impurities from water. While the above description contains one main embodiment, the invention is intended to cover all variations of this invention.

Some modifications have been suggested and others may come to mind, such as fastening the media cartridges to the outside of the drum.

The scope of the invention should be determined not by the embodiments shown, but by the appended claims and their legal equivalents.

What is claimed is:

1. A replaceable filtration system comprising:
   (a) a drum, rotatably supported in a water treatment tank;
   (b) means for providing fluid communication between said water treatment tank and a second tank;
   (c) means for rotating said drum;
   (d) means for circulating water;
   (e) at least a cartridge for holding replaceable filtration media;
   (f) means for fastening said cartridge to said drum; and
   (g) a plurality of capture fins attached to said drum, said capture fins being arranged to capture an air-water mixture for drum rotation.

2. The apparatus of claim 1 wherein said means for providing said fluid communication between said water treatment tank and said second tank includes:
   (a) an influent pipe and;
   (b) an effluent pipe.

3. The apparatus of claim 1 wherein said means for rotating said drum includes a motor.

4. The apparatus of claim 1 wherein said means for circulating water includes an air pump.

5. The apparatus of claim 1 wherein said means for circulating water includes a water pump.

6. The apparatus of claim 1 comprising: a plurality of said cartridges.

7. The apparatus of claim 1 wherein said means for fastening said cartridge to said drum includes the use of a thumbscrew.

8. The apparatus of claim 1 wherein said means for fastening said cartridge to said drum includes a snap fit.

9. The apparatus of claim 1 wherein said means for fastening said cartridge to said drum includes screwing said cartridge into said drum.

10. The apparatus of claim 1 wherein said cartridge includes a screw on lid.

11. The apparatus of claim 1 wherein said cartridge includes a snap on lid.

12. The apparatus of claim 1 wherein said cartridge is made of plastic.

13. The apparatus of claim 1 wherein said cartridge is made of ceramic.

14. The apparatus of claim 1 wherein said cartridge is comprised of a mesh bag.

15. The apparatus of claim 1 wherein said cartridge is disposable.

* * * * *